United States Patent
Swier et al.

(10) Patent No.: US 10,793,681 B1
(45) Date of Patent: Oct. 6, 2020

(54) HYDROSILYLATION CURABLE SILICONE RESIN

(71) Applicant: Dow Silicones Corporation, Midland, MI (US)

(72) Inventors: Steven Swier, Midland, MI (US); Haruhiko Furukawa, Tokyo (JP); Michitaka Suto, Tokyo (JP); Kazuhiro Nishijima, Tokyo (JP); Atsushi Sugie, Tokyo (JP)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 16/482,499

(22) PCT Filed: Apr. 18, 2018

(86) PCT No.: PCT/US2018/028087
§ 371 (c)(1),
(2) Date: Jul. 31, 2019

(87) PCT Pub. No.: WO2018/204068
PCT Pub. Date: Nov. 8, 2018

Related U.S. Application Data

(60) Provisional application No. 62/502,005, filed on May 5, 2017.

(51) Int. Cl.
*C08G 77/20* (2006.01)
*C08G 77/00* (2006.01)

(52) U.S. Cl.
CPC ............. *C08G 77/80* (2013.01); *C08G 77/20* (2013.01)

(58) Field of Classification Search
None
See application file for complete search history.

(56) References Cited

U.S. PATENT DOCUMENTS

| | | | |
|---|---|---|---|
| 7,553,915 B2 | 6/2009 | Kashiwagi | |
| 7,705,093 B2 | 4/2010 | Yamakawa et al. | |
| 7,705,104 B2 | 4/2010 | Kashiwagi et al. | |
| 7,858,198 B2 | 12/2010 | Kashiwagi et al. | |
| 8,222,752 B2* | 7/2012 | Hiramatsu | C08L 83/04 257/76 |
| 9,765,192 B2 | 9/2017 | Horstman et al. | |
| 2004/0249103 A1* | 12/2004 | Morimoto | C08G 77/045 528/34 |
| 2012/0146088 A1* | 6/2012 | Tanikawa | C09K 3/1018 257/100 |

FOREIGN PATENT DOCUMENTS

| | | | | |
|---|---|---|---|---|
| JP | 2010116464 A | * | 5/2010 | ............. C08G 77/44 |
| WO | 2015042285 | | 3/2015 | |

OTHER PUBLICATIONS

Machine translation of JP-2010116464, translation generated Jun. 2020, 32 pages. (Year: 2020).*

* cited by examiner

*Primary Examiner* — Robert S Loewe

(57) ABSTRACT

A hydrosilylation curable polysiloxane comprising at least one of units of formula (I) and units of formula (II), wherein Ar is $C_6$-$C_{20}$ aryl, R1 is $C_2$-$C_{20}$ alkenyl, and $R^2$, $R^3$, $R^4$ and $R^5$ independently are $C_1$-$C_{20}$ hydrocarbyl.

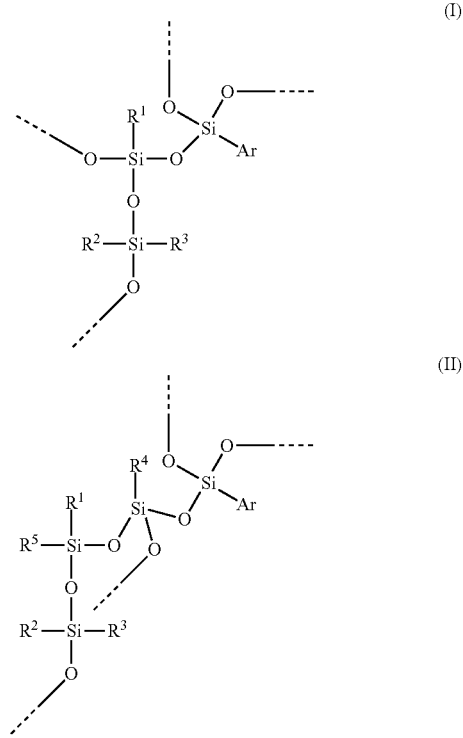

4 Claims, No Drawings

HYDROSILYLATION CURABLE SILICONE RESIN

This invention relates to a hydrosilylation curable silicone resin having a good cure rate, while maximizing thermal stability.

Hydrosilylation curable silicone compositions comprising alkylsiloxane units are known, including encapsulants for light emitting diodes (LED), but the known compositions do not exhibit a combination of good cure speed and improved thermal stability. Typically increasing cure speed comes at the expense of reduced thermal stability since the catalysts and linking groups used in cure reduce stability. The current invention overcomes these limitations.

Hydrosilylation curable silicone compositions comprising both $T^{Vi}$ and $T^{Ph}$ units are known, e.g., in US20160208055. However, this reference does not teach the compositions of the present invention.

STATEMENT OF THE INVENTION

The present invention provides a hydrosilylation curable polysiloxane comprising at least one of units of formula (I) and units of formula (II)

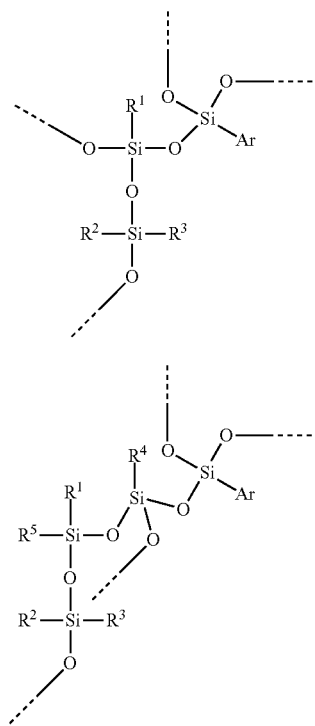

wherein Ar is $C_6$-$C_{20}$ aryl, $R^1$ is $C_2$-$C_{20}$ alkenyl, and $R^2$, $R^3$, $R^4$ and $R^5$ independently are $C_1$-$C_{20}$ hydrocarbyl.

DETAILED DESCRIPTION

Percentages are weight percentages (wt %) and temperatures are in ° C. unless specified otherwise. Operations were performed at room temperature unless specified otherwise. Alkyl groups are saturated hydrocarbyl groups that may be straight or branched. Preferably, alkyl groups have from one to six carbon atoms, preferably one or two. Alkenyl groups are hydrocarbyl groups that may be straight or branched and which have at least one aliphatic carbon-carbon double bond, preferably one aliphatic carbon-carbon double bond. Preferably, alkenyl groups have no aromatic rings. Preferably, alkyl and alkenyl groups are unsubstituted. Aryl groups are derived from aromatic compounds which can be mono- or poly-nuclear. Aryl groups may be substituted by alkyl or alkoxy groups. Preferably, aryl groups are unsubstituted. Preferably, aryl groups are hydrocarbyl groups.

As used herein, unless otherwise indicated, molecular weights, $M_n$, $M_w$ and $M_z$ have the conventional meanings and are determined by gel permeation chromatography. Molecular weights are reported herein in units of g/mol.

Preferably, the —OSi($R^2$)($R^3$)— unit in formula (I) or (II) is part of a polysiloxane chain having from 10 to 500 of these units ([$R^2R^3SiO_{2/2}$] units or D units); preferably at least 20, preferably at least 30, preferably at least 35; preferably no more than 400, preferably no more than 300, preferably no more than 200, preferably no more than 150. Preferably, $R^2$ and $R^3$ independently represent $C_1$-$C_{12}$ alkyl or $C_6$-$C_{12}$ aryl, preferably phenyl or $C_1$-$C_{12}$ alkyl, preferably phenyl or $C_1$-$C_4$ alkyl, preferably $C_1$-$C_{12}$ alkyl, preferably $C_1$-$C_6$ alkyl, preferably $C_1$-$C_4$ alkyl, preferably methyl or ethyl, preferably methyl. Preferably, $R^2$ and $R^3$ represent the same alkyl group. Preferably, $R^4$ and $R^5$ independently represent $C_1$-$C_{12}$ alkyl or $C_6$-$C_{12}$ aryl, preferably phenyl or $C_1$-$C_{12}$ alkyl, preferably $C_1$-$C_{12}$ alkyl, preferably $C_1$-$C_6$ alkyl, preferably $C_1$-$C_4$ alkyl, preferably methyl or ethyl, preferably methyl. Bonds ending in "--" or "---" are understood as connecting to a silicon atom of another siloxane unit or to hydrogen.

Preferably, $R^1$ is $C_2$-$C_{12}$ alkenyl, preferably $C_2$-$C_8$ alkenyl, preferably $C_2$-$C_6$ alkenyl, preferably $C_2$-$C_4$ alkenyl, preferably vinyl. Preferably, when $R^1$ is larger than vinyl, the double bond is in the terminal position. Preferably, $R^1$ is acyclic. The siloxane units comprising $R^1$ are designated as [$R^1SiO_{3/2}$] units or T-alkenyl or $T^{alkenyl}$ units.

Preferably, Ar is $C_6$-$C_{14}$ aryl, preferably $C_6$-$C_{12}$ aryl, preferably $C_6$-$C_{10}$ aryl, preferably phenyl. Preferably, Ar comprises no heterocyclic aromatic rings. Preferably, Ar comprises no heteroatoms. Preferably, Ar comprises no fused rings. Preferably, any substituents on Ar groups are limited to $C_1$-$C_4$ alkyl or alkoxy groups. Preferably, Ar groups are unsubstituted. The siloxane units comprising Ar are designated as [$ArSiO_{3/2}$] units or T-aryl or $T^{aryl}$ units.

Preferably, the polysiloxane comprises from 0.5 to 4.5 mole % of $C_1$-$C_{20}$ hydrocarbyl groups comprising at least one carbon-carbon double bond, preferably from 0.8 to 4, preferably from 1 to 3, preferably from 1 to 2.5. Preferably, the polysiloxane comprises from 20 to 60 mole % $T^{aryl}$ units; preferably at least 25 mole %, preferably at least 28 mole %; preferably no more than 55 mole %, preferably no more than 52 mole %. Preferably, the polysiloxane comprises from 0.5 to 4.5 mole % $T^{alkenyl}$ units; preferably at least 0.8 mole %, preferably at least 1.0 mole %; preferably no more than 4 mole %, preferably no more than 3 mole %, preferably no more than 2.5 mole %. Preferably, the polysiloxane comprises from 40 to 80 mole % D units; preferably at least 45 mole %, preferably at least 48 mole %; preferably no more than 75 mole %, preferably no more than 72 mole %. Preferably, the $T^{aryl}$ units are arranged in a non-linear block, preferably having a molecular weight of at least 500 g/mole. Preferably, the polysiloxane has a weight-average molecular weight of at least 20,000 g/mole. Preferably, at least 50 mole % of the units having carbon-carbon double bonds (this does not include aryl units) are present as T units, preferably at least 60 mole %, preferably at least 70 mole %, preferably at least 80 mole %, preferably at least 90 mole %.

Preferably, the hydrosilylation curable polysiloxane comprises units of formula (I). Preferably, less than 50 mole % of $R^1$ groups in the hydrosilylation curable polysiloxane is from units of formula (II), preferably less than 25 mole %, preferably less than 10 mole %, preferably less than 5 mole %, preferably less than 1 mole %.

In a preferred embodiment of the invention, the hydrosilylation curable polysiloxane comprises a unit of formula (III).

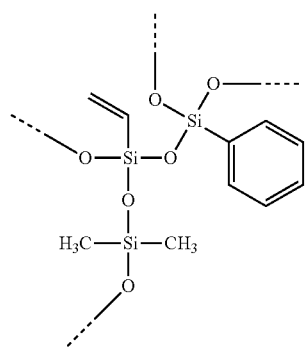

(III)

In a preferred embodiment of the invention, the hydrosilylation curable polysiloxane comprises a unit of formula (IV).

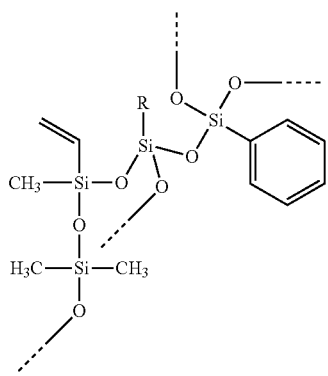

(IV)

The present invention is further directed to a curable silicone composition comprising a hydrosilylation curable polysiloxane. Preferably, the composition further comprises a hydrosilylation catalyst and a crosslinker.

Preferably, the hydrosilylation catalyst is present in the curable silicone composition in a catalytic quantity along with the polysiloxane in an amount sufficient to promote curing of the composition. Suitable hydrosilylation catalysts include, without limitation, a platinum group metal which includes platinum, rhodium, ruthenium, palladium, osmium, or iridium metal or an organometallic compound thereof and a combination of any two or more thereof. In a preferred embodiment, the hydrosilylation catalyst is platinum black, platinum compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum dichloride, and complexes of the platinum compounds with olefins or low molecular weight organopolysiloxanes or platinum compounds microencapsulated in a matrix or core-shell type structure.

Preferably, the hydrosilylation catalyst is present in the composition in an amount from 0.1 to 5 ppm; preferably at least 0.2 ppm, preferably at least 0.25 ppm; preferably no more than 3 ppm, preferably no more than 2 ppm, preferably no more than 1.5 ppm, preferably no more than 1 ppm, preferably no more than 0.7 ppm, preferably no more than 0.5 ppm.

Preferably, the crosslinker is polysiloxane containing at least two silicon-bonded hydrogen atoms, preferably at least three. Preferably the silicon-bonded groups other than the silicon-bonded hydrogen are phenyl or $C_{1-10}$ alkyl, in an amount that provides about 0.8 moles to about 2.5 moles silicon-bonded hydrogen per 1 mole of the total alkenyl in the organopolysiloxane, preferably from 0.8 to 1.5, preferably from 0.9 to 1.2. Preferably, the crosslinking agent itself is an organopolysiloxane comprising about 0.3 mass % to 2.0 mass % silicon-bonded hydrogen. Preferably, a straight chain organopolysiloxane containing $RSiO_{3/2}$ units, $R_2SiO_{2/2}$ units, $R_3SiO_{1/2}$, and $HR_2SiO_{1/2}$ and/or $HRSiO_{2/2}$ wherein the silicon-bonded R groups are phenyl or $C_1$-$C_{10}$ alkyl, preferably phenyl or methyl. A preferred crosslinker is $M^H_{0.6}T^{Ph}_{0.4}$ (any group not specified on an "M" unit is methyl, e.g. $M^H$ is $M^{H(CH_3)_2}$).

EXAMPLES

Preparation of Siloxanes

Example 1

{same process as Ex. 2, but with higher amount T-phenyl as shown in Table 3}

Example 2

(T-Vinyl incorporated at the Linear Capping Step (using optimal method for controlling product molecular weight))
Composition: 45 wt % Ph-T (Dow Corning RSN-0217 Flake Resin: 217 flake in short)+55 wt % 101 dp PDMS+1.4 mol % T-Vinyl (from vinyl triacetoxysilane: VTA)

A 1 L 4 neck round bottom flask was loaded with 217 flake (90.0 g, 0.659 mols Si) and toluene (240.77 g). The flask was equipped with a thermometer, TEFLON stir paddle, and a Dean Stark apparatus attached to a water-cooled condenser. A nitrogen blanket was applied. A heating mantle was used for heating. Dean Stark was prefilled with toluene. Heated at reflux for 30 minutes. This step was done to remove any water that might be present. A solution of toluene (59.23 g)+silanol terminated PDMS (110.0 g, 1.478 mols Si, 0.0293 mols SiOH) was capped with vinyltriacetoxysilane (VTA). It was prepared in a glove box (same day) under nitrogen by adding VTA (7.14 g, 0.0307 mols Si) to the silanol terminated PDMS and mixing at room temperature for 1 hour.

Resin-Linear Coupling—

Cooled a couple of degrees below reflux. The diacetoxy capped PDMS solution was added to the resin solution quickly. Heated at reflux for 2 hrs.

Resin-Resin Coupling CF=5.0

CF=[mols MTA/ETA/mols Si on phenyl-T]*100 Cooled to 106° C. and then added 50/50 MTA/ETA (7.49 g, 0.0330 mols) Heated at reflux for 1 hr.

Water Treatments 1 & 2—

Repeated the following process 2x: [At ~90° C. added DI water (23.0 g) and then removed the water by azeotropic distillation.] (each wash-20:1 molar ratio, water: total MTA/ETA+VTA)

Molecular Weight Control—

Distilled off 100.2 g of volatiles to increase the solids content up to ~50%. Heated at reflux for 4 hours. Molecular weight growth followed a $2^{nd}$ order polynomial.

Comparative Example 1

(T-Vinyl incorporated in RR Coupling Step)

Composition: 56 wt % Ph-T (217 flake)+44 wt % 46 dp PDMS+1.57 mol % T-vinyl

A 2 L 4 neck round bottom flask was loaded with 217 flake (Ph-T) (224.0 g, 1.64 mols Si) and toluene (394.12 g). The flask was equipped with a thermometer, TEFLON stir paddle, and a Dean Stark apparatus attached to a water-cooled condenser. A nitrogen blanket was applied. A heating mantle was used for heating. Dean Stark was prefilled with toluene. Heated at reflux for 30 minutes. This step was done to remove any water that might be present. A solution of toluene (94.77 g)+silanol terminated PDMS (176.0 g, 2.36 mols Si, 0.102 mols SiOH) was capped with a 50/50 molar ratio of methyltriacetoxysilane and ethyltriacetoxysilane (MTA/ETA). It was prepared in a glove box (same day) under nitrogen by adding MTA/ETA (24.45 g, 0.1076 mols Si) to the silanol terminated PDMS and mixing at room temperature for 1 hour.

Resin-Linear Coupling—

Cooled a couple of degrees below reflux. The diacetoxy capped PDMS solution was added to the resin solution quickly. Heated at reflux for 2 hrs.

Resin-Resin Coupling CF=4.0

CF=[mols VTA/mols Si on phenyl-T]*100 Cooled to 106° C. and then added vinyltriacetoxysilane (15.23 g, 0.0656 mols) Heated at reflux for 1 hr.

Water Treatments 1 & 2—

Repeated the following process 2x: [At ~90° C. added DI water (46.8 g) and then removed the water by azeotropic distillation.]

Distilled off 224.1 g of volatiles targeting ~60% solids content. This step was mainly done to remove some acetic acid to increase the efficiency of the final two water treatments.

Water Treatments 3 & 4—

Repeated the following process 2x: [At ~90° C. added DI water (46.8 g) and then removed the water by azeotropic distillation.]

Final Workup—

Distilled off 109.3 g of volatiles to increase the NVC to 70-75%.

Cooled to room temperature and then pressure filtered through a Magna, Nylon, Supported, Plain 5.0 micron filter.

Comparative Example 2

(D-Vinyl incorporated after the resin-linear coupling step (using optimal method for controlling product molecular weight))

Composition: 45 wt % Ph-T (217 flake)+55 wt % 101 dp PDMS+1.4 mol % D-Vinyl A 1 L 4 neck round bottom flask was loaded with 217 flake (90.0 g, 0.659 mols Si)+toluene (240.77 g). The flask was equipped with a thermometer, teflon stir paddle, and a Dean Stark apparatus attached to a water-cooled condenser. A nitrogen blanket was applied. A heating mantle was used for heating. Dean Stark was pre-filled with toluene. Heated at reflux for 30 minutes. This was done to remove any water that might be present. A solution of toluene (59.23 g)+silanol terminated PDMS (110.0 g, 1.478 mols Si, 0.0293 mols SiOH) was capped with MTA/ETA. It was prepared in a glove box (same day) under nitrogen by adding 50/50 MTA/ETA (6.98 g, 0.0307 mols Si) to the silanol terminated PDMS and mixing at room temperature for 1 hour.

Resin-Linear Coupling—

Cooled a couple of degrees below reflux. The diacetoxy capped PDMS solution was added to the resin solution quickly. Heated at reflux for 2 hrs.

Vinylmethyldiacetoxysilane Coupling—

At 106° C. added vinylmethyldiacetoxysilane (5.83 g, 0.0310 mols Si). Heated at reflux for 1 hr.

VMDA Water Treatment—

At ~90° C. added DI water (27.0 g). Stoichiometry-20:1 molar ratio: water: total MTA/ETA+VMDA. Heated to reflux and removed water by azeotropic distillation.

Resin-Resin Coupling CF=2.0

CF=[mols MTA/ETA/mols Si on phenyl-T]*100–Cooled to 106° C. and then added 50/50 MTA/ETA (3.00 g, 0.0132 mols). Heated at reflux for 1 hr.

Water Treatments 1 & 2—

Repeated the following process 2x: [At ~90° C. added DI water (27.0 g) and then removed the water by azeotropic distillation.]

Molecular Weight Control—

Distilled off 100.5 g of volatiles to increase the solids content to ~50%. Heated at reflux for 2 hours and 50 minutes. Molecular weight growth followed a $2^{nd}$ order polynomial.

Water Treatments 3, 4, 5—

Repeated the following process 3x: [At ~90° C. added DI water (27.0 g) and then removed the water by azeotropic distillation.]

Distilled off some toluene under vacuum to increase the solids content to ~75%. This was done on a rotovapor at an oil bath temperature of 50° C. in a 1 L round bottom flask. Increasing solids under vacuum was done to minimize molecular weight growth. Pressure filtered through a 142 mm diameter *Magna*, Nylon, Supported, Plain, 5.0 Micron filter.

Results:

NVC samples were clear. Isolated Yield: 230.0 g solution (@76.1% NVC=175.0 g solids)

Refractive Index of product film=1.468 (Measured on a Metricon 2010 Prism Coupler using 633 nm red light)

Comparative Example 3

(T-Vinyl incorporated in RR Coupling Step)

Composition: 45 wt % Ph-T (217 flake)+55 wt % 101 dp PDMS+1.4 mol % T-Vinyl

A 1 L 4 neck round bottom flask was loaded with 217 flake (90.0 g, 0.659 mols Si) and toluene (240.77 g). The flask was equipped with a thermometer, TEFLON stir paddle, and a Dean Stark apparatus attached to a water-cooled condenser. A nitrogen blanket was applied. A heating mantle was used for heating. Dean Stark was prefilled with toluene. Heated at reflux for 30 minutes. This step was done to remove any water that might be present. A solution of toluene (59.23 g)+silanol terminated PDMS (110.0 g, 1.478 mols Si, 0.0293 mols SiOH) was capped with a 50/50 molar ratio of methyltriacetoxysilane and ethyltriacetoxysilane (MTA/ETA). It was prepared in a glove box (same day) under nitrogen by adding MTA/ETA (6.98 g, 0.0307 mols Si) to the silanol terminated PDMS and mixing at room temperature for 1 hour.

Resin-Linear Coupling—

Cooled a couple of degrees below reflux. The diacetoxy capped PDMS solution was added to the resin solution quickly. Heated at reflux for 2 hrs.

Resin-Resin Coupling CF=4.7

CF=[mols VTA/mols Si on phenyl-T]*100 Cooled to 106° C. and then added vinyltriacetoxysilane (7.14 g, 0.0307 mols) Heated at reflux for 1 hr.

Water Treatments 1 & 2—

Repeated the following process 2x: [At ~90° C. added DI water (22.1 g) and then removed the water by azeotropic distillation.]

Distilled off 100.1 g of volatiles targeting ~50% solids content. Heated at reflux for 1.25 hours to increase the molecular weight.

Water Treatments 3, 4, & 5—

Repeated the following process 3x: [At ~90° C. added DI water (22.1 g) and then removed the water by azeotropic distillation.]

Final Workup—

Distilled off some volatiles (120.2 g) to increase the solids content up to ~75% solids. Cooled to room temperature and then pressure filtered through a Magna, Nylon, Supported, Plain 5.0 micron filter.

Comparative Example 4

(D-Vinyl incorporated in RR Coupling Step, $T^{Ph}$-$D^{Vinyl}$-$D^{Me2}$)

Composition: 45 wt % Ph-T (217 flake)+55 wt % 101 dp PDMS+1.4 mol % D-Vinyl

A 1 L 4 neck round bottom flask was loaded with 217 flake (90.0 g, 0.659 mols Si) and toluene (240.77 g). The flask was equipped with a thermometer, TEFLON stir paddle, and a Dean Stark apparatus attached to a water-cooled condenser. A nitrogen blanket was applied. A heating mantle was used for heating. Dean Stark was prefilled with toluene. Heated at reflux for 30 minutes. This step was done to remove any water that might be present. A solution of toluene (59.23 g)+silanol terminated PDMS (110.0 g, 1.478 mols Si, 0.0293 mols SiOH) was capped with vinyl methyl diacetoxysilane (VMDA, 5.78 g, 0.0307 mols Si). It was prepared in a glove box (same day) under nitrogen by adding VMDA to the silanol terminated PDMS and mixing at room temperature for 1 hour.

Resin-Linear Coupling—

Cooled a couple of degrees below reflux. The capped PDMS solution was added to the resin solution quickly. Added 21.9 g toluene. Heated at reflux for 4 hrs. The reaction mixture turned very hazy while cooling to room temperature. This route therefore is ineffective in producing a useful material for optical applications.

Cure Speed Testing a) With Same Amount of Pt—

DSC thermograms were obtained at 10° C./min (open pan, He atmosphere) of 1.57 mol % Vinyl-T modified 56 wt % Ph-T—46 dp PDMS resin-linears (formulation: $M^H_{0.6}T^{Ph}_{0.4}$ SiH cross-linker with SiH/Vinyl=1.0, 500 ppm DODS (dioctadecyl disulfide, 2/1 mol/mol TPP/Pt (triphenyl phosphine) and 1 ppm Pt) with the products of i) C. Ex. 1 and ii) Ex. 1.

The formulation containing the product of Ex. 1 exhibited a lower reaction exothermic peak ($T_{peak}$; 144.15° C.) than that exhibited by the formulation containing the product of C. Ex. 2 (160.98° C.), showing that the product of Ex. 1 produced a higher cure rate.

b) With Varying Amounts of Pt—

DSC analysis (20° C./min in He atmosphere, open pan) of the hydrosilylation reaction exotherm on 56 wt % Ph-T (217)+44% 46 dp PDMS, 1.57 mol % Vinyl-T sample as a function of Pt level; with the products of i) Ex. 1 and ii) C. Ex. 1; The temperature at the peak of the reaction exotherm ($T_{peak}$) was calculated; formulation: T-Vinyl resin-linear+ $M^H_{0.6}T^{Ph}_{0.4}$ (SiH/Vinyl=1.0)+Pt.

The table below contains values of $T_{peak}$ in ° C. at different levels of Pt. The data fit a logarithmic equation: $T_{peak}=11.11 \ln(\text{ppm Pt})+142.46$ with a correlation coefficient $R^2=0.9967$.

|  | 0.25 ppm Pt | 0.5 ppm Pt | 1 ppm Pt | 2.5 ppm Pt |
|---|---|---|---|---|
| Ex. 1 | 158.2 | 150.3 | 142.1 | 132.9 |
| C. Ex. 1 |  |  | 156.0 |  |

To achieve the same $T_{peak}$ as C. Ex. 1 at 1 ppm, Ex. 1 would require only 0.31 ppm Pt.

TABLE 2

Vinyl functional Ph-T - PDMS examples and comparative examples. Compositions: 1 ppm Pt, 250 ppm DODS, 13.5 ppm TPP, RMS 356 SiH/Vi = 1

|  |  | Base resin-linear Composition | mol % Vinyl | Vinyl environment | Cure speed | Optical clarity |
|---|---|---|---|---|---|---|
| Ex. 1 | 26358-023 | 56 wt % Ph-T - 46 dp PDMS | 1.57 | $T^{Ph}$-$T^{Vinyl}$-$D^{Me2}$ | high | high |
| Ex. 2 | 26358-027 | 45 wt % Ph-T - 101 dp PDMS | 1.40 | $T^{Ph}$-$T^{Vinyl}$-$D^{Me2}$ | high | high |
| C. Ex. 1 | 26358-021 | 56 wt % Ph-T - 46 dp PDMS | 1.57 | $T^{Ph}$-$T^{Vinyl}$-$T^{Ph}$ | low | high |
| C. Ex. 2 | 26358-035 | 45 wt % Ph-T - 101 dp PDMS | 1.40 | $T^{Ph}$-$D^{Vinyl}$-$T^{Ph}$ | medium | high |
| C. Ex. 3 | 26358-037 | 45 wt % Ph-T -101 dp PDMS | 1.40 | $T^{Ph}$-$T^{Vinyl}$-$T^{Ph}$ | low | high |
| C. Ex. 4 | 26358-033 | 45 wt % Ph-T - 101 dp PDMS | 1.40 | $T^{Ph}$-$D^{Vinyl}$-$D^{Me2}$ | n/a | low |

Detailed Results that Form the Basis of Table:

| mol % vinyl | wt % Ph-T | Vinyl environment | Formulation (ppm), RMS 356 (SiH/Vi = 1) | | | | | | |
|---|---|---|---|---|---|---|---|---|---|
| | | | Pt, ppm | DODS ppm | TPP, ppm | $T_{onset-1}$ °C. | $T_{peak-1}$ °C. | $\Delta H_{react-1}$ J/g | $T_{onset-2}$ °C. |
| 1.57 | 56 | $T^{Ph}$-$T^{Vinyl}$-$D^{Me2}$ | 1 | 250 | 13.5, 6 mo. | 116.9 | 150.8 | 5.74 | 247.1 |
| 1.57 | 56 | $T^{Ph}$-$T^{Vinyl}$-$T^{Ph}$ | 1 | 250 | 13.5 | 137.0 | 163.2 | 4.94 | long tail |
| 1.40 | 45 | $T^{Ph}$-$T^{Vinyl}$-$D^{Me2}$ | 1 | 250 | 13.5 | 119.0 | 152.9 | 4.47 | long tail |
| 1.40 | 45 | $T^{Ph}$-$T^{Vinyl}$-$T^{Ph}$ | 1 | 250 | 13.5 | 136.4 | 169.6 | 4.78 | long tail |
| 1.40 | 45 | $T^{Ph}$-$D^{Vinyl}$-$D^{Me2}$ | sample not optically clear (ineffective RL coupling ?) *** | | | | | | |
| 1.40 | 45 | $T^{Ph}$-$D^{Vinyl}$-$T^{Ph}$ | 1 | 250 | 13.5 | 122.4 | 156.2 | 6.60 | weak shoulder |

TABLE 3

| | mol % Vi. | wt % Ph-T | Vinyl environment | Cured | | | 500 h 225° C. | | | Rate of change during 225° C. at 23° C. | | |
|---|---|---|---|---|---|---|---|---|---|---|---|---|
| | | | | TS MPa | EB % | YM MPa | TS MPa | EB % | YM MPa | TS MPa/h | EB %/h | YM MPa/h |
| Ex. 1 | 1.57 | 56 | $T^{Ph}$-$T^{Vinyl}$-$D^{Me2}$ | 6.74 | 94 | 116 | 7.15 | 29 | 103 | 0.0008 | −0.13 | −0.026 |
| Ex. 2 | 1.40 | 45 | $T^{Ph}$-$T^{Vinyl}$-$D^{Me2}$ | 5.41 | 171 | 19.6 | 4.39 | 56 | 17 | −0.0021 | −0.23 | −0.005 |
| C. Ex. 1 | 1.57 | 56 | $T^{Ph}$-$T^{Vinyl}$-$T^{Ph}$ | 6.11 | 109 | 152 | 8.05 | 35 | 112 | 0.0039 | −0.15 | −0.081 |
| C. Ex. 2 | 1.40 | 45 | $T^{Ph}$-$D^{Vinyl}$-$T^{Ph}$ | 4.88 | 211 | 37.8 | 5.01 | 70 | 31 | 0.0003 | −0.28 | −0.014 |
| C. Ex. 3 | 1.40 | 45 | $T^{Ph}$-$T^{Vinyl}$-$T^{Ph}$ | 4.74 | 232 | 27.5 | 4.78 | 59 | 22 | 0.0001 | −0.33 | −0.010 |

TABLE 4

Vinyl functional Ph-T - PDMS formulated with RMS 356, different levels of Pt (no inhibitor) and comparative examples with results of cure speed (from DSC) and thermal stability; composition only contains the Vinyl functional resin-linear, RMS 356 (SiH/Vi = 1) and Pt

| | mol % Vinyl | Pt, ppm | Vinyl environment | DSC cure exotherm Temperature | Linear $T_g$ change after 500 h @225° C. | Change in E'(120° C.) during 225° C. aging |
|---|---|---|---|---|---|---|
| Ex. 3 | 1.57 | 1 | $T^{Ph}$-$T^{Vinyl}$-$D^{Me2}$ | 142° C. | 18.6° C. | 0.146 MPa/h |
| Ex. 4 | 1.57 | 0.31 | $T^{Ph}$-$T^{Vinyl}$-$D^{Me2}$ | 156° C. | 6.0° C. | 0.137 MPa/h |
| C. Ex. 5 | 1.57 | 1 | $T^{Ph}$-$T^{Vinyl}$-$T^{Ph}$ | 156° C. | 23.9° C. | 0.150 MPa/h |

These results demonstrate that the composition of this invention is able to produce better thermal stability at lower platinum levels while maintaining cure speed.

Some additional experiments were performed to introduce $D^{Vi}$ next to $D^{Me2}$ without the issue of incompatibility noted in the detailed results of Table 2:

Vinyl-D Next to $D^{Me2}$ vs. $T^{pH}$: Cure Speed

Another way to incorporate Vinyl-D next to $D^{Me2}$ is to cap with vinylmethyl diacetoxysilane followed by hydrolysis to turn the relatively unreactive second acetoxy group into silanol to ensure that further coupling with resin is possible. Since methyl/ethyl triacetoxysilane is needed to invoke resin-linear and resin-resin coupling this results in a relatively cumbersome synthesis and a vinyl environment of $T^{Ph}$-$T^{Me/Et}$-$D^{Vi}$-$D^{Me2}$ (Table 7 Example 3). Table 7 compares this system with the control where Vinyl-D is used as part of the RR coupling agent forming a $T^{Ph}$-$D^{Vi}$-$T^{Ph}$ chain. Again, the data rheology and DSC data confirms that Vinyl moieties next to a $D^{Me2}$ unit exhibit higher cure speed as expected.

Table 1: Vinyl functional Ph-T—PDMS resin-linears with summarized results as far as composition and cure speed; compositions: 1 ppm Pt, TPP (triphenylphosphine), RMS 352 SiH/Vi=1.

| ID | | Example 5 | Comp. Example 5 |
|---|---|---|---|
| Vi @ Chemical Composition | Calc. | PhT45-DP100 Linear ends $D_{65.0}{}^{Vi}D_{1.1}{}^{Me/Et}T_{2.9}{}^{Ph}T_{31.0}$ | PhT45-DP100 new-2 On resin $D_{65.0}{}^{Ph}T_{31.0}{}^{Vi}D_{1.1}{}^{R}T_{2.9}$ |
| | (NMR) | ${}^{Vi}D_{1.35}D_{66.51}{}^{R}T_{1.39}{}^{Ph}T_{30.75}$ | |
| Vi | Wt % | 0.32 | 0.32 |
| MW | GPC | 43400 | 46900 |
| min G' | Pa | 13,320 | 885 |

-continued

| ID | | Example 5 | Comp. Example 5 |
|---|---|---|---|
| max tan δ | | 1.295 | 4.445 |
| time to tan δ < 1 | min | 7.367 | 35.97 |
| DSC T peak | ° C. | 143.0 | 146.7 |

Example 5: $T^{pH}$-$T^{Me/Et}$-$D^{Vi}$-$D^{Me2}$: Resin Linear Containing D-Vinyl Capped Linear Followed by Hydrolysis and Further Coupling with $T^{pH}$ Preparation of $M^{Vi(OH)}$-Terminated PDMS (Dp122)

A 300 mL 4-necked flask was equipped with thermometer, Dean-Stark trap attached to reflux condenser, and mechanical stirrer with Teflon stir paddle. OH-terminated PDMS (Dp103, 120 g, 15.7 mmol) and toluene (65 g) were loaded to the flask and stirred under reflux for 1 h for dehydration. After the solution was cooled to room temperature, excess ViMeSi(OAc)$_2$ (11.8 g, 62.8 mmol) was added and stirring was continued at room temperature for 0.5 h, then 2 h under reflux. Stripping of the residual ViMeSi(OAc)$_2$ and toluene under reduced pressure (2-3 torr, 100° C., N$_2$ bubbling) afforded $M^{Vi(OAc)}{}_2$-terminated PDMS as an intermediate.

Then, the flask with the intermediate were added toluene (50 g), water (50 g), NaHCO$_3$ (6.44 g), and triethylamine (0.7 g) and stirring was continued for overnight at room temperature (progress of the reaction was monitored by IR (decrease of C=O/Si-Me)). After the aqueous layer was removed from the mixture, the organic layer was washed with water repeatedly (50 mL×3). Stripping of toluene and triethylamine under reduced pressure (2-3 torr, 50° C., N$_2$ bubbling) gave crude product which was purified by Zeta-plus filtration (40QSH) to afford $M^{Vi(OH)}$-terminated PDMS as clear oil (101. 5 g, Dp 122 by $^{29}$Si NMR)

Preparation of Resin-Linear (R/L=45/55) with $M^{Vi(OH)}$-terminated PDMS (Dp122)

(Day 1)

A 200 mL 4-necked flask was equipped with thermometer, Dean-Stark trap attached to reflux condenser, and mechanical stirrer with Teflon stir paddle. The $M^{Vi(OH)}$-terminated PDMS (41.25 g) and toluene (22.5 g) were loaded to the flask under N$_2$ atmosphere and stirred under reflux for 0.5 h for dehydration. After the solution was cooled to room temperature, ETS900 (2.167 g) was added and stirring was continued for 0.5 h at room temperature to give a solution with ETS900 capped linear.

A 500 mL 4-necked flask (a flask with a drain on its bottom is favorable) was equipped with thermometer, Dean-Stark trap attached to reflux condenser, and mechanical stirrer with Teflon stir paddle. Toluene (90 g) and 217 flake (33.75 g) were loaded to the flask under N$_2$ atmosphere and stirred under reflux for 1 h for dehydration. After the solution was cooled to below 100° C., the above ETS900 capped linear solution was added to the flask and reflux was continued for 2 h (Resin-Linear coupling).

(Day 2~)

The obtained solution was heated to 100° C. and added ETS900 (3.37 g, CF=6). Then the solution was heated under reflux for 2.5 h for Resin-Resin coupling (final viscosity was 28.29 cSt). After the solution was cooled to below 85° C., Dean-Stark trap was removed and reflux condenser was attached directly to the flask. To the flask was added 35 g of water and reflux was continued for 1 h. After the solution was cooled to below 85° C., aqueous layer was removed by syringe (or drain on the bottom of the flask, if available). The similar washing process was repeated for 7 times at 60-80° C. by water ×3, brine ×2, then water ×2. Dean-Stark trap was attached to the flask again and the solution was heated to remove residual water and toluene to concentrate NVC of the solution to ca. 60%. The solution was filtered through Zeta-plus filter (150GN) to afford 88.5 g of final product (NVC:64.43%). (If the solution was clear before filtration, heat it to 80° C. once to accelerate precipitation of Ts).

Comparative Example 5: $T^{pH}$-$D^{Vi}$-$T^{pH}$: Resin Linear where D-Vinyl is Used after Resin-Linear Coupling Preparation of Resin-Linear (R/L=45/55) with OH-Terminated PDMS (Dp100)

(Day 1)

A 200 mL 4-necked flask was equipped with thermometer, Dean-Stark trap attached to reflux condenser. OH terminated PDMS (82.5 g) and toluene (45.0 g) were loaded to the flask under N$_2$ atmosphere and stirred by stir bar under reflux for 0.5 h for dehydration. After the solution was cooled to room temperature, ETS900 (5.300 g) was added and stirring was continued for 0.5 h at room temperature to give a solution with ETS900 capped linear.

A 1000 mL 4-necked flask (a flask with a drain on its bottom is favorable) was equipped with thermometer, Dean-Stark trap attached to reflux condenser, and mechanical stirrer with Teflon stir paddle. Toluene (180.0 g) and 217 flake (67.5 g) were loaded to the flask under N$_2$ atmosphere and stirred under reflux for 0.5 h for dehydration. After the solution was cooled to below 100° C., the above ETS900 capped linear solution was added to the flask and reflux was continued for 2 h (Resin-Linear coupling).

(Day 2~)

The obtained solution was heated to 100° C. and added ETS900 (5.5057 g). Then the solution was heated under reflux for 1 h for Resin-Resin coupling (viscosity was 20.6 cSt). After the solution was cooled to below 100° C., vinylmethyldiacetoxysilane was added to the solution and reflux was continued for 2 h. After the solution was cooled to below 85° C., Dean-Stark trap was removed and reflux condenser was attached directly to the flask. To the flask was added 40 g of water and reflux was continued for 1 h. After the solution was cooled to below 85° C., aqueous layer was removed by syringe (or drain on the bottom of the flask, if available). The similar washing process was repeated for 7 times at 60-80° C. by water ×3, brine ×2, then water ×2. Dean-Stark trap was attached to the flask again and the solution was heated to remove residual water and toluene to concentrate NVC of the solution to ca. 70%. The solution was filtered through Zeta-plus filter (150GN) to afford 163.9 g of final product (NVC: 70.4%).

The invention claimed is:

1. A hydrosilylation curable polysiloxane comprising at least one of units of formula (I) and units of formula (II)

(I)

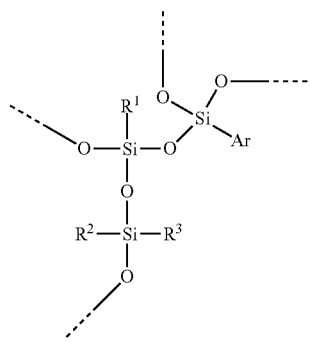

(II)

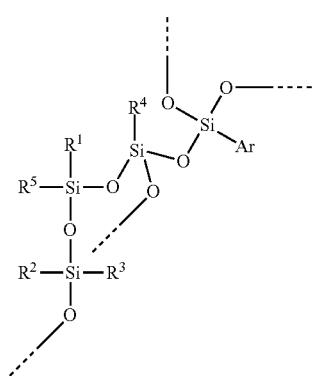

wherein Ar is $C_6$-$C_{20}$ aryl, $R^1$ is $C_2$-$C_8$ alkenyl, and $R^2$, $R^3$, $R^4$ and $R^5$ independently are $C_1$-$C_4$ alkyl; and wherein the polysiloxane comprises unit of formula (I) and in which less than 25 mole % of R1 groups in the hydrosilylation curable polysiloxane is from units of formula (II), an $[R^2R^3SiO_{2/2}]$ unit in formula (I) or formula (II) is part of a polysiloxane chain having from 10 to 500 $[R^2R^3SiO_{2/2}]$ units, the polysiloxane comprises from 20 to 60 mole % $[ArSiO_{3/2}]$ units and from 40 to 80 mole % $[R^2R^3SiO_{2/2}]$ units, and the polysiloxane further comprises from 0.5 to 4.5 mole % $[R^1SiO_{3/2}]$ units.

2. The polysiloxane of claim 1 in which $R^2$, $R^3$, $R^4$ and $R^5$ independently represent methyl or ethyl.

3. The polysiloxane of claim 2 in which an $[R^2R^3SiO_{2/2}]$ unit in formula (I) is part of a polysiloxane chain having from 30 to 200 $[R^2R^3SiO_{2/2}]$ units.

4. The polysiloxane of claim 3 in which $R^2$, $R^3$, $R^4$ and $R^5$ are methyl, $R^1$ is vinyl and Ar is phenyl.

* * * * *